United States Patent [19]
Schultz et al.

[11] Patent Number: 6,101,559
[45] Date of Patent: Aug. 8, 2000

[54] SYSTEM FOR IDENTIFYING THE PHYSICAL LOCATION OF ONE OR MORE PERIPHERAL DEVICES BY SELECTING ICONS ON A DISPLAY REPRESENTING THE ONE OR MORE PERIPHERAL DEVICES

[75] Inventors: Stephen M. Schultz; Mark J. Thompson, both of Harris County, Tex.

[73] Assignee: Compaq Computer Corporation, Houston, Tex.

[21] Appl. No.: 08/955,790

[22] Filed: Oct. 22, 1997

[51] Int. Cl.[7] .................................................. G06F 13/14
[52] U.S. Cl. ............................ 710/15; 340/635; 345/82; 369/82
[58] Field of Search ..................... 340/539, 635; 345/82; 369/30; 395/821, 828; 710/15, 8

[56] References Cited

U.S. PATENT DOCUMENTS

| | | | |
|---|---|---|---|
| 5,305,013 | 4/1994 | Daniels ..................................... | 345/82 |
| 5,534,887 | 7/1996 | Bates et al. ............................. | 345/120 |
| 5,598,143 | 1/1997 | Wentz ..................................... | 340/539 |
| 5,631,882 | 5/1997 | Mascenik ................................ | 369/30 |
| 5,666,557 | 9/1997 | Cassidy et al. ......................... | 395/828 |
| 5,673,023 | 9/1997 | Smith ..................................... | 340/571 |
| 5,815,080 | 9/1998 | Taguchi .................................. | 340/635 |
| 5,880,955 | 3/1999 | Matoba et al. ......................... | 364/188 |

OTHER PUBLICATIONS

IBM Technical Disclosure Bulletin, Characterizing and Tracking Liquid Crystal Display Panel Defects, vol. 36, No. 11, Nov. 1993, pp. 659–661.

*Primary Examiner*—Thomas C. Lee
*Assistant Examiner*—Abdelmoniem Elamin
*Attorney, Agent, or Firm*—Akin, Gump, Strauss, Hauer & Feld

[57] ABSTRACT

A method and apparatus which indicates the physical location of one or more peripheral devices. A system operator uses an input device to select an icon that is displayed on a display device. The icon represents a single peripheral device or a group of peripheral devices among a plurality of peripheral devices. For example, an icon may represent a disk drive, a group of disk drives disposed within a storage unit, an array of disk drives, an array of disk drives disposed within one or more storage units, etc. After the system operator selects the icon, an indicator light associated with each of the one or more peripheral devices represented by the icon illuminates to identify the physical location of the selected peripheral device or devices. Other peripheral devices are contemplated, such as a bank of modems, floppy drives, CD-ROM drives, etc.

23 Claims, 4 Drawing Sheets

SYSTEM FOR IDENTIFYING THE PHYSICAL LOCATION OF ONE OR MORE PERIPHERAL DEVICES BY SELECTING ICONS ON A DISPLAY REPRESENTING THE ONE OR MORE PERIPHERAL DEVICES

FIELD OF THE INVENTION

The present invention relates to indicating the physical location of one or more peripheral devices, and more particularly to a method and apparatus for locating one or more physical devices among a plurality of devices coupled to a computer system.

DESCRIPTION OF THE RELATED ART

Disk drive array storage systems are becoming ubiquitous as disk drives increase in storage density and decrease in price. Disk drive arrays are becoming the primary solution to the relatively higher cost and complexity associated with high density magnetic storage disks which were, in the past, used almost exclusively as the main depository of data for medium and large computer systems.

A disk drive array is a collection of relatively inexpensive disk drives, otherwise referred to as physical drives, which are grouped together to create an array of physical drives. A drive array includes one or more subsets of physical drives, called logical drives or logical volumes, which may physically transcend across all of the physical drives in the drive array, or may include only a portion of the physical drives. An operating system views a logical drive as a single, contiguous storage space, even though the storage space may be made up of portions of several physical drives. One reason for building a drive array subsystem is to create a logical device that has a relatively high data transfer rate. A higher transfer rate may be accomplished by "ganging" multiple physical drives together and transferring data to or from the drives in parallel. For example, striping techniques are often used to distribute the data in a drive array.

An example of a commercially available Array Controller for implementing a drive array is the SMART and SMART-2 Array Controllers by Compaq Computer Corporation. The SMART-2 array controller includes two Fast-Wide SCSI (Small Computer System Interface) buses, each capable of supporting up to seven physical disk drives. Different versions operate with either the Industry Standard Architecture (ISA), the Extended ISA (EISA), or the Peripheral Components Interconnect (PCI) expansion buses and operates in conjunction with various operating systems, including NetWare® by Novell, MS-DOS®, Windows 3.x, Windows 95® or Windows NT® by Microsoft, OS/2 by IBM, UnixWare, SCO Unix, etc. The SMART-2 array controller supports RAID levels 0, 1, 4 and 5 and controls up to 14 arrays using between one and 14 physical drives, where each array includes between one and 32 logical drives per controller. Each of the logical drives may be a different size and use a different fault tolerance method.

SCSI devices typically have pre-assigned or "hard" identification (ID) numbers that do not change from boot to boot. A Fibre Channels system, however, uses "soft" IDs for each device, such as a disk drive, on a Fibre Channel® Arbitrated Loop. The ID of each device may therefore change from boot to boot. There is no practicable way to physically follow the fiber cables coupled to the devices to locate a particular device. The computer system can locate any drive for disk operations, but a system operator or other user cannot easily determine the physical location of a particular disk drive especially if the disk drive is one of a plurality of physical drives used by the computer system.

The problem of locating a disk drive is essentially the same for any type of peripheral device coupled to a computer system. Locating a peripheral device is particularly troublesome where there are a plurality of similar type devices, such as several hard disk drives, floppy disk drives, CD-ROM drives, a bank of modems, a plurality of monitors, etc. A system and method according to the present invention provides a solution of physically locating one or more peripheral devices coupled to a computer system.

SUMMARY OF THE INVENTION

A peripheral device location system according to the present invention indicates the location of a peripheral device, or group of devices, coupled to a computer system. The present application is advantageous for locating one or more disk drives, which may or may not be configured as a drive array. A system operator uses an input device to select an icon representing a desired device, or group of devices, where the icon is displayed on a display device. After selecting the desired icon using the input device, processing apparatus causes at an indicator light associated with each of one or more peripheral devices corresponding to the selected icon to illuminate. For example, an icon may represent a disk drive, a group of disk drives disposed within a storage unit, an array of disk drives, an array of disk drives disposed within one or more storage units, etc. In this way, locating any peripheral device becomes a rather simple job for the system operator.

In one embodiment, the one or more indicator lights are each light emitting diodes (LEDs) and are disposed on an outer surface of a physical drive, such as a disk drive. Alternatively, the one or more LEDs are disposed on an outer surface of a tray to which the selected peripheral device is mounted and/or electrically connected, such as a disk drive tray for a disk drive. Another type of indicator light may be used, such as a liquid crystal display (LCD), or the like, or any similar type of indicator light known to those skilled in the art. Each indicator light corresponding to a selected icon may illuminate in a blinking pattern or may be illuminated steady state. The illumination may be for a selected time period or may occur indefinitely until commanded to stop.

In an embodiment described herein, a communication channel, such as an optic channel or link or the like, is used to interface between the processing apparatus and one or more disk drive storage units, where each storage unit includes a plurality of physical disk drives and at least one SCSI bus which may be in the form of a backplane for the disk drive storage unit.

A computer system according to the present invention includes a bus, memory for storing a configuration program, a display device, an input device, a peripheral system including one or more peripheral devices and corresponding indicator lights and a central processor. The processor executes the configuration program to cause the display device to display one or more icons, each representing one or more peripheral devices. Selection of an icon causes one or more indicator lights corresponding to the one or more peripheral devices associated with the selected icon to illuminate. Each icon may represent a single device, such as a single drive array, or a group of devices, such as those disk drives in a drive array or those disk drives disposed within one or more storage units.

In an embodiment described herein, the one or more peripheral devices comprise one or more disk drives configured separately or in one or more drive arrays. The disk drives are disposed within one or more storage units. The disk drives are SCSI drives coupled to corresponding SCSI buses of the storage units. Each storage unit includes an array controller for interfacing the SCSI buses to a communication channel, similar to that described above. The peripheral bus comprises a PCI bus, and a controller card interfaces the PCI bus to the communication channel.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
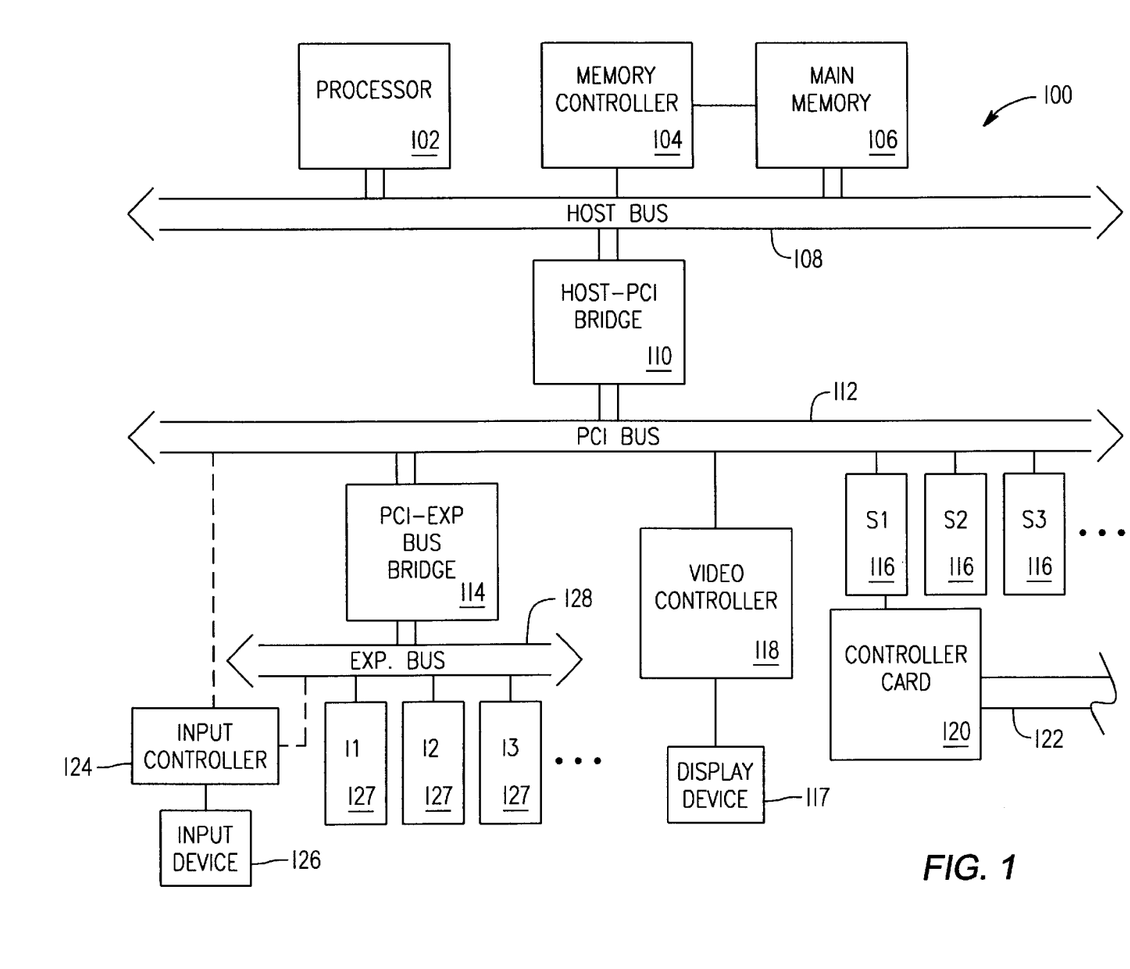
FIG. 1 is a block diagram of a computer system utilizing one embodiment of a peripheral device location system according to the present invention for locating disk drives.

Referring now to FIG. 1, a block diagram is shown of a computer system 100 used in conjunction with a peripheral device location system according to the present invention. The computer system 100 is preferably an IBM-compatible, personal computer (PC) system or the like typically used for workstations or server systems. The computer system 100 includes a host bus 108 coupled to at least one central processing unit (CPU) identified as processor 102. Processor 102 preferably includes any one of several microprocessors and supporting external circuitry typically used in PCs, such as the 80386, 80486, Pentium™, P6, etc. microprocessors from Intel Corp., where the external circuitry preferably includes an external or level two (L2) cache or the like (not shown). Although the present invention is illustrated with an IBM-compatible type PC system, it is understood that the present invention is applicable to other types of computer systems and processors as known to those skilled in the art.

A memory controller 104 is coupled to the host bus 108 and to the main memory 106 to receive and control main memory operations. The main memory 106 is coupled to the host bus 108 via buffers (not shown) for data transfer. The main memory 106 is preferably implemented with one or more memory boards plugged into compatible memory slots on the motherboard, although any main memory configuration is contemplated. The computer system 100 includes a PCI bus 112 coupled to the host bus 108 via a Host-PCI bridge 110, which handles translation of signals between the host bus 108 and the PCI bus 112. The PCI bus 112 is typically implemented with one or more PCI slots 116, individually labeled S1, S2, S3 and so on, where each of the PCI slots 116 are configured to receive compatible PCI adapter cards incorporating one or more PCI devices as known to those skilled in the art. Typical PCI devices include network interface cards (NICs) disk controllers such as a SCSI (Small Computer System Interface) disk controller, video or graphics controllers, etc.

Figure 2:
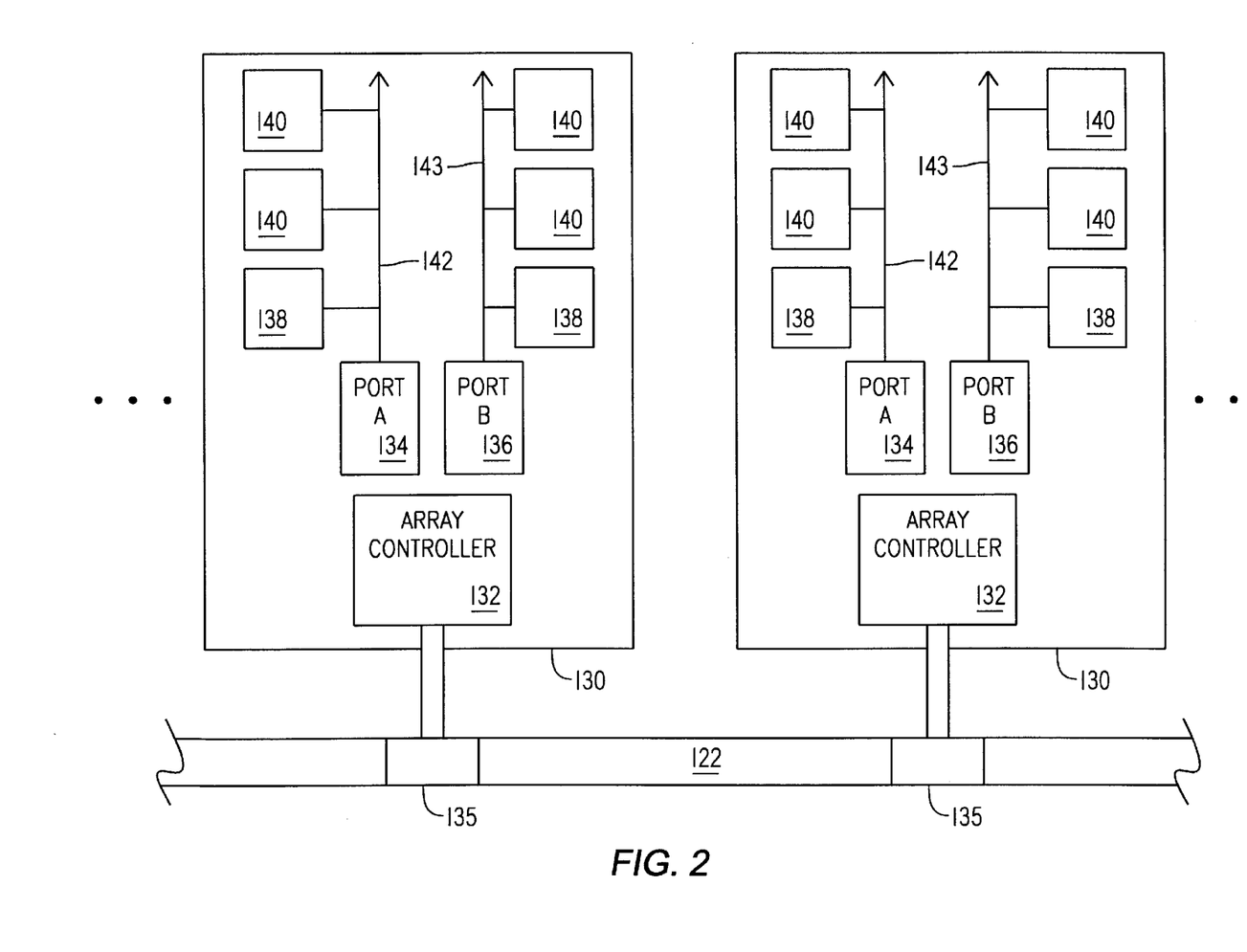
FIG. 2 is a block diagram depiction of a plurality of disk drive storage units coupled to a communication channel utilized in the computer system of FIG. 1.

A controller card 120 is fashioned as a PCI card that is plugged into one of the PCI slots 116. The controller card 120 interfaces between the PCI bus 112 and a communication channel 122, which in one embodiment is a fiber optic cable or link. The channel 122 in turn communicates with the disk drive storage units 130 (FIG. 2). The channel 122 is preferably an optic channel implemented in accordance with the Fibre Channel Standard (FCS), which is an integrated set of standards developed by the American National Standards Institute (ANSI). Fibre Channel (FC) is a high performance serial link supporting its own as well as higher level protocols such as the FDDI, SCSI, High Performance Parallel Interface (HIPPI), Intelligent Peripheral Interface (IPI), etc. It should be understood, however, that channel 122 need not be an optic channel, but instead may be any commonly used electrical conductor such as a coaxial cable, a ribbon wire assembly, or other similar device used to bus electrical signals between one or more points in a computer system. Also, any other standard or protocol other than FC that is compatible with the chosen media is contemplated. Channel 122 is implemented according to FC to allow for greater bandwidth between the computer system 100 and a plurality of peripheral devices, typically disk drives.

Referring to FIG. 2, channel 122 connects controller card 120 with a plurality of disk drive storage units 130. Each disk drive storage unit 130 connects to channel 122 with a connector 135, which is an optic connector if channel 122 is an optic channel and is an electrical connector if channel 122 includes electrical signal conductors. Each disk drive storage unit 130 is physically a self-contained storage box that includes a backplane SCSI bus which includes two SCSI buses 142, 143, although a single backplane SCSI bus is contemplated as well. Disk drive storage unit 130 also includes an array controller 132 which interfaces between channel 122 and SCSI ports A and B, 134 and 136, respectively. Each SCSI port 134, 136 is coupled to a unique SCSI bus 142, 143, respectively. In another embodiment, a single SCSI port and a single SCSI bus may be utilized by the disk drive storage unit 130. Coupled to each SCSI bus 142, 143 is an indicator light controller 138 and a plurality of physical drives 140. In another embodiment, any disk controller may be used to control the plurality of disk drives in a disk drive storage unit 130, without the disk controller limited to being an array controller. Additionally, channel 122 may be a SCSI bus connected to a plurality of drives—each of which includes an indicator light.

Figure 3:
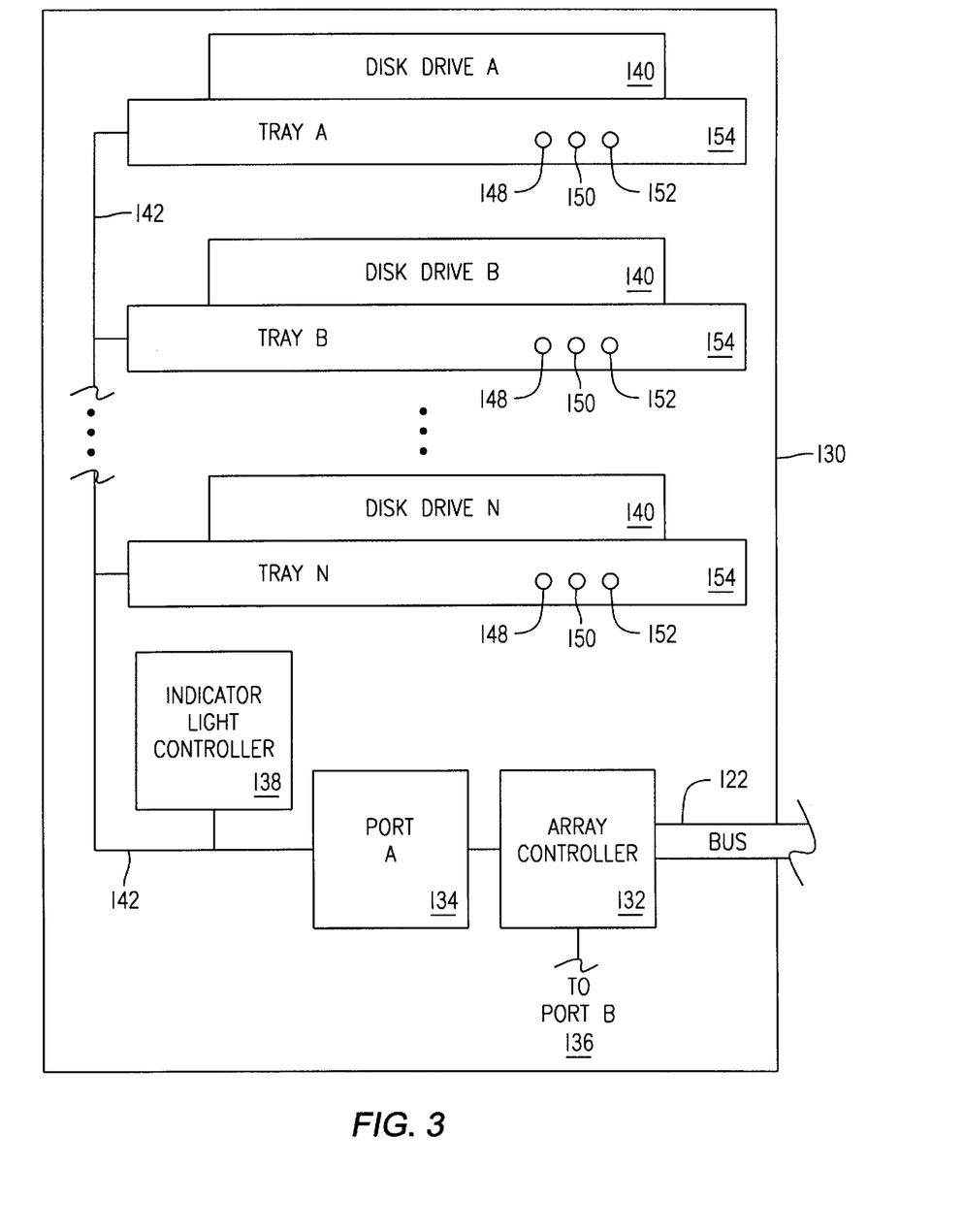
FIG. 3 is a block diagram of a portion of a disk drive storage unit of FIG. 2.

Referring to FIG. 3 a portion of a disk drive storage unit 130 is shown which may include a plurality of disk drive trays 154, where each drive 140 rests on and is electrically coupled to a corresponding tray 154. As shown, indicator lights 148, 150 and 152 are disposed on an outer surface of each tray 154 adjacent to or in close proximity to the associated drive 140. Of course, the lights 148, 150 and 152 could otherwise be disposed directly on an outer surface of each drive 140. Indicator lights 148, 150, 152 are LEDs, LCDs, or the like, or any other similar type of device known to those skilled in the art. Indicator light 148 is typically an online indicator light that shows whether the corresponding drive 140 is on and configured. Indicator light 150 is typically an activity LED for the corresponding drive 140. Indicator light 152 is typically a failure indicator for the corresponding drive 140. It is noted, however, that the indicator lights 148, 150 and 152 may serve any purpose and have any function during normal operation, where any one or more of the indicator lights 148, 150 and 152 are further utilized to indicate the location of the drive due to their close physical proximity. Alternatively, any one or more of these lights may be dedicated to being a location indicator light without serving any other function.

In FIG. 3, the channel 122 is shown coupled to array controller 132, which in turn is coupled to SCSI port A 134. The output of SCSI port A is coupled to SCSI bus 142. Additionally, SCSI bus 142 is coupled to one or more of the trays 154. In this embodiment, each respective tray 154 and associated disk drive 140 are electrically coupled to one another to enable data communication between the computer system 100 and those disk drives 140 coupled via the SCSI bus 142. In another embodiment, trays 154 are not included and each physical drive 140 is implemented to connect directly to the respective SCSI bus 142. It should be understood that SCSI port B for disk drive storage unit 130 is typically configured in a manner similar to that of SCSI port A shown in FIG. 3.

Again referring to FIG. 1, the present invention utilizes an input device 126, such as a mouse, keyboard, light pen, pointing device or any other similar type user input device known to those skilled in the art. The input device 126 is coupled to a corresponding input controller 124 which can be coupled to PCI bus 112 or is otherwise coupled to expansion bus 128, depending on the particular system implementation. The computer system 100 also includes a display device 117, such as a monitor or the like, which is coupled to a video controller 118 which is coupled to the PCI bus 112. As described further below, a configuration utility is loaded into the main memory 106 and is executed by the processor 102. The configuration utility displays graphics on the display device 117 and detects manipulations and other inputs of the input device 126. The configuration utility preferably generates graphic user interface (GUI) with graphic icons or the like, including an input icon and device icons representing devices to be accessed or otherwise selected. For example, the utility generates a logical pointer icon on a display device 117 that is moved by the input device 126, and also generates icons representing one or more of the peripheral devices, or disk drives 140.

Figure 4:
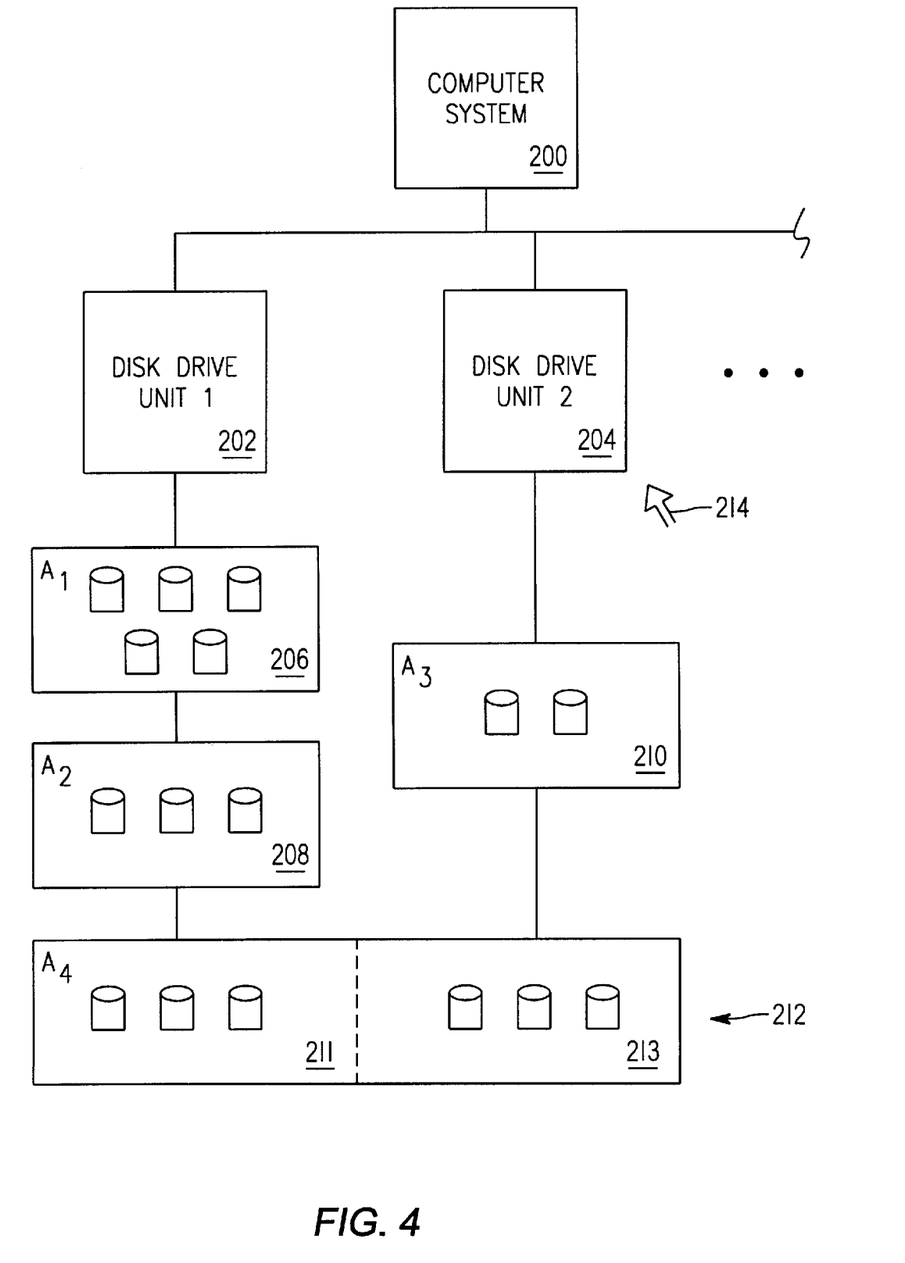
FIG. 4 is a schematic representation of a menu of logical icons which are displayed on a display device according to the present invention.

Referring to FIG. 4, a graphical representation of a menu of logical icons displayed on the display device 117 is depicted. A computer system logical icon 200 is shown generally representing the computer system 100. A disk drive storage unit 1 logical icon 202 and a disk drive storage unit 2 logical icon 204 are shown generally representing corresponding ones of the disk drive storage units 130. In the embodiment shown, the configuration utility is an array configuration utility to configure one or more drive arrays using the disk drives 140. The array configuration utility displays a graphic interface to enable an operator or user to select any disk drive storage unit 130, or to select a single disk drive 140 within any disk drive storage unit 130, or to select any disk drive array within computer system 100.

In particular, an array A1 logical icon 206 represents a plurality of drives 140 configured as logical array A1 within a corresponding one of the disk drive storage units 130 represented by disk drive storage unit 1. Likewise, array A2 logical icon 208 represents another plurality of drives 140 configured as logical array A2 within the same disk drive storage unit 130. In a similar manner, an array A3 logical icon 210 represents a plurality of disk drives 140 configured as logical array A3 within another disk drive storage unit 130 represented by drive unit 2. It is noted that drive arrays may span across the disk drive storage units 130. For example, an array A4 logical icon 212 represents a plurality of disk drives 140 within drive storage unit 1 and a plurality of drives within drive unit 2 which are configured as a single logical array A4. Arrays are typically subdivided into one or more logical drives that may be partitioned and formatted for used by an operating system. The hatched line in logical icon 212 indicates the physical division between the disk drive storage unit 1 drives 211 and the disk drive storage unit 2 drives 213 which make up array A4. Thus, the array A4 includes disk drives 140 which are included within disk drive storage units 1 and 2. The logical icons for additional drive units, not shown, would be displayed in a similar manner to those depicted in FIG. 4 and described herein. It should also be noted that disk drive storage unit 1 logical icon 202 includes all physical drives 140 which make up arrays A1, A2 and a portion of A4, as shown in FIG. 4. In a similar manner, disk drive storage unit 2 logical icon 204 includes all physical drives which make up arrays A3 and a portion of A4.

To determine the physical location of a single disk drive or a plurality of disk drives 140, an operator views the various logical icons displayed on the display device 117 which are shown in FIG. 4. As explained, these icons represent various disk drives which may be configured as logical arrays for the computer system 100. The operator then selects an individual drive or a group of drives to determine its physical location by selecting the logical icon representing the individual drive or the group of drives. The operator manipulates pointer device 126 to move the pointer logical icon 214 displayed on display device 117 so it overlays a portion of an icon. By clicking on the desired logical icon with pointer device 126, a utility program within computer system 100 causes at least one indicator light associated with each selected drive to illuminate.

The configuration utility, stored in main memory 106 and executed by the processor 102, functions to generate the input or pointer icon 214 and each of the other logical icons depicted in FIG. 4 and causes these icons to be displayed on display device 117. The configuration utility detects manipulations, movements and/or buttons of the input device 126 and displays the interaction between pointer icon 214 and the desired logical icon representing one or more of the disk drives 140 to be located. After detecting a button or click, the configuration utility sends a command to channel 122 via PCI bus 112, which command is received and decoded by the array controller 132. After receiving and decoding the command, array controller 132 sends a corresponding command to the appropriate indicator light controller 138, which then illuminates one or more of the indicator lights 148, 150, 152 of the selected disk drive(s) 140. The indicator lights 148, 150, 152 illuminate in a steady continuous pattern, in a blinking pattern of any duty cycle, or in any other pattern desired for appropriate location of the selected physical disk drives 140. In this manner, a system operator can quickly locate the physical location of any drive or plurality of drives 140. The indicator lights 148, 150, 152 may be illuminated or blinked until a predetermined condition is met, such as the operator closing the configuration utility program, moving the cursor to another icon, a determination of inactivity for a predetermined period of time, etc.

Referring to FIG. 1, it is noted that the computer system 100 may be implemented in any one of many alternative manners. For example, an industry standard architecture (ISA) bus or an extended ISA (EISA) bus could be substituted for the PCI bus 112. For an EISA bus, the Host-PCI bridge 110 would be replaced by an EISA bus controller (EBC) for handling transitions of signals between the host bus 102 and an EISA bus. The PCI slots 116 are instead EISA slots for receiving EISA compatible cards, and the controller card 120 is replaced by a corresponding array controller card implemented for interfacing an EISA bus. Alternatively, the computer system 100 includes an expansion bus 128 coupled to the primary PCI bus 112 through a PCI-expansion bus bridge 114. The expansion bus 114 is any one of many different types, including another PCI bus, an ISA bus, an EISA bus or the microchannel architecture (MCA) bus, among others. For an EISA bus, the PCI-expansion bus bridge 114 is a PCI-EISA bridge. The expansion bus 128 preferably includes one or more expansion or input/output (I/O) slots 127, individually labeled I1, I2, I3, etc. An array controller configured for plugging into one of the slots 127 and for interfacing the expansion bus 128 could be used instead of the controller card 120. Such a controller card would interface with channel 122. In yet another alternative embodiment, the controller card 120 is mounted on the motherboard of the computer system 100 and electrically interfaces the PCI bus 112, or an ISA bus, an EISA bus, the expansion bus 128, etc.

Other components, devices and circuitry are normally included in the computer system 100, though not shown, are known in the art and are not considered particularly relevant to the present invention. Such other components, devices and circuitry are coupled to the host bus 108, the PCI bus 112, the expansion bus 128 or other input/output (I/O) buses (not shown) that may be included. For example, the computer system 100 may include an integrated system peripheral (ISP), an interrupt controller such as an advanced programmable interrupt controller (APIC) or the like, arbiter(s), a system ROM (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc.

As shown in FIG. 2, the controller card 120 is preferably implemented according to any of the SCSI standards and includes an optic interface circuit (not shown) for interfacing with channel 122. As shown in FIG. 1, each array controller includes SCSI ports A and B, 134 and 136 respectively, for interfacing SCSI buses 142 and 143 with channel 122. A series of SCSI hard disk drives 140 are coupled to the first SCSI bus 142 and another series of SCSI hard disk drives 140 are coupled to the second SCSI bus 143 for each drive unit 130. The SCSI buses 142, 143 can be internal or external to the computer system 100 as desired. The controller card 120 and the disk drives 140 may be implemented according to SCSI-1 (ANSI X3.131-1986), SCSI-2 (ANSI X3.131-1994) including Fast SCSI, Wide SCSI-2 and Fast Wide SCSI or SCSI-3, which includes a plurality or family of standards including Fast-20 SCSI, Ultra SCSI, DoubleSpeed SCSI, etc. The controller card 120 and the drives 140 may alternatively be implemented according to any one of several disk drive implementations, such as the Integrated Drive Electronics (IDE), the AT Attachment (ATA) or ATA-2 or ATA-3, the enhanced-IDE (EIDE), the ATA Packet Interface (ATAPI), etc. The SCSI array controller 132 for each drive unit 130 operates the various attached SCSI drives 140 as an array of drives, preferably implementing striping and fault tolerant techniques such as RAID levels 1–5. A separate indicator light controller 138 is coupled to each of the SCSI buses 142, 143. In other embodiments, a single indicator light controller could control both SCSI buses 142, 143.

Referring to FIG. 3, as discussed above, each indicator light controller 138 of each drive unit 130 provides control functions to ensure that when a particular disk drive 140 is selected by the input device 126, the controller 138 coupled to the same SCSI bus as the selected disk drive 140 causes at least one indicator light 148, 150, 152 associated with the selected disk drive 140 to illuminate independently and in a manner distinctive of the light's normal operation. For example, in one contemplated embodiment, the LED normally indicating drive activity 150 would also produce a distinctively different blinking pattern to indicate locator selection. In this manner, a system operator can determine the physical location of any physical disk drive 140 coupled to the computer system 100 by using an input device 126 to move a pointer icon 214 to a desired icon representing one or more disk drives. By clicking on the desired icon, the operator causes at least one indicator light associated with the selected drive or drives to illuminate.

Other alternative location methods are also contemplated. For example, a user or operator could program a unique name for each peripheral device using a configuration utility, where the unique name is stored in the device itself, such as on disk, in a nonvolatile RAM (NVRAM), etc. Each device further includes its own indicator light and illuminates its indicator light when instructed according to the name passed from the host system.

It can now be appreciated that a system and method according to the present invention solves the problem extant heretofore of not being able to easily identify the physical location of any peripheral device coupled to a computer system. The present invention was illustrated in an embodiment for locating one or more selected disk drives of a multitude of disk drives. However, the present invention may be used in a similar manner for selecting and locating any peripheral device of a computer system. This invention is particularly advantageous for locating one or more of a plurality of peripheral devices coupled to a computer system, such as several floppy drives, CD-ROM drives, a bank of modems, a plurality of monitors, etc.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A peripheral device location system, comprising:
    a plurality of peripheral devices;
    a display device;
    a plurality of indicator lights, each located in close proximity to a corresponding one of said plurality of peripheral devices;
    an input device; and
    processing apparatus, coupled to said plurality of peripheral devices, to said input device, to said display device and to said plurality of indicator lights that causes said display device to display at least one icon, that detects selection of said at least one icon via said input device and that causes illumination of at least one of said plurality of indicator lights in such a manner as to identify the location of each peripheral device among the plurality of peripheral devices that correspond to a selected icon.

2. The system of claim 1
    wherein said processing apparatus causes said display device to display a plurality of icons, and wherein said processing apparatus detects selection of any one of said plurality of icons via said input device and causes illumination of any of said plurality of indicator lights in such a manner as to identify corresponding ones of said plurality of peripheral devices with a selected icon.

3. The system of claim 1, further comprising:

said processing logic further causing said display device to display a group icon representing a group of said plurality of peripheral devices, wherein said processing logic detects selection of said group icon and causes illumination of each of said plurality of indicator lights corresponding to each peripheral device within said group of peripheral devices.

4. The system of claim 1, wherein said input device comprises a mouse device.

5. The system of claim 1, wherein at least one of said plurality of indicator lights comprises a light emitting diode.

6. The system of claim 1, wherein said processing apparatus further comprises:

memory for storing a configuration utility program; and a processor, coupled to said memory, that executes said configuration utility program to cause said display device to display said at least one icon, to detect inputs from said input device to select said at least one icon, and to send a corresponding command that causes illumination of at least one of said plurality of indicator lights.

7. The system of claim 6, further comprising:

logic, coupled to said processor and said plurality of indicator lights, that receives said corresponding command and that causes illumination of said at least one of said plurality of indicator light.

8. The system of claim 6, further comprising: said each of said plurality of peripheral devices that correspond to a selected icon receiving said corresponding command and illuminating a corresponding one of said plurality of indicator lights.

9. The system of claim 1, further comprising:

said plurality of peripheral devices comprising a plurality of disk drives;

said at least one icon comprising a logical drive icon that corresponds to data stored on at least two of said plurality of disk drives; and said processing apparatus detecting selection of said logical drive icon via said input device and respondingly causing illumination of each of said plurality of indicator lights that corresponds to said at least two of said plurality of disk drives.

10. A computer system, comprising:

a bus;

memory coupled to said bus for storing a configuration program;

a display device coupled to said bus;

an input device coupled to said bus;

a peripheral system coupled to said bus, comprising:
 a plurality of peripheral devices; and
 a plurality of indicator lights, each located in close proximity with a corresponding one of said plurality of peripheral devices; and a processor, coupled to said bus, that executes said configuration program to cause said display device to display at least one icon, to detect inputs from said input device selecting said at least one icon and to respondingly cause illumination of at least one of said plurality of indicator lights in such a manner as to identify the location of one or more peripheral devices among said plurality of peripheral devices.

11. The computer system of claim 10, further comprising:

said processor executing said configuration program to cause said display device to display a plurality of icons wherein each of said plurality of icons corresponds to one of said plurality of peripheral devices, to detect selection of any one of said plurality of icons via said input device, and to illuminate a corresponding one of said plurality of indicator lights in response to selection of said any one of said plurality of icons.

12. The system of claim 10, further comprising:

said processor further executing said configuration program to cause said display device to display a group icon representing a group of said plurality of peripheral devices, wherein said processor detects selection of said group icon and illuminates each of said plurality of indicator lights corresponding to each peripheral device within said group of peripheral devices.

13. The computer system of claim 11, further comprising:

said plurality of peripheral devices comprising a plurality of disk drives;

said group of said plurality of peripheral devices comprising a drive array; and said group icon representing said drive array.

14. The computer system of claim 10, further comprising:

said plurality of peripheral devices comprising a plurality of disk drives;

at least one storage unit coupled to said peripheral bus and including at least one of said plurality of disk drives; and said processor executing said configuration program to cause said display device to display at least one storage icon representing said at least one storage unit, to detect selection of said storage icon via said input device, and to illuminate each of said plurality of indicator lights that corresponds to said at least one of said plurality of disk drives disposed within said at least one storage unit.

15. The computer system of claim 14, further comprising:

said at least one storage unit including at least two of said plurality of disk drives and corresponding indicator lights disposed therein; and said processor executing said configuration program to detect selection of said storage icon via said input device, and to illuminate each of said corresponding indicator lights corresponding to said at least two disk drives disposed within said at least one storage unit.

16. The computer system of claim 14, further comprising:

said at least one storage unit comprising a plurality of storage units, each including at least one of said plurality of disk drives and corresponding indicator lights disposed therein; and said processor executing said configuration program to cause said display device to display a plurality of storage icons, each representing one of said plurality of storage units, to detect selection of any one of said plurality of storage icons via said input device, and to illuminate each of said corresponding indicator lights disposed within a storage unit corresponding to a selected storage icon.

17. The computer system of claim 14, further comprising:

said at least one storage unit comprising a plurality of storage units, each including at least one of said plurality of disk drives and corresponding indicator lights disposed therein; and said processor executing said configuration program to cause said display device to display at least one array icon representing at least one of said plurality of disk drives within at least two of said plurality of storage units configured as a drive array, to detect selection of said at least one array icon via said input device, and to illuminate each of said indicator lights corresponding to each disk drive within said drive array.

18. The computer system of claim 10, further comprising:

said plurality of peripheral devices comprising a plurality of disk drives;

said at least one icon comprising a logical drive icon that corresponds to data stored on at least two of said plurality of disk drives; and said processor executing said configuration program detecting selection of said logical drive icon via said input device and respondingly causing illumination of each of said plurality of indicator lights that corresponds to said at least two of said plurality of disk drives.

19. A method of visually identifying the location of at least one peripheral device among a plurality of peripheral devices coupled to a computer system, wherein the at least one peripheral device has an indicator light associated therewith, and wherein the computer system includes a display device which displays an input icon associated with an input device, comprising the steps of:

displaying a peripheral icon;

selecting the peripheral icon on the display device using the input device; and causing the indicator light associated with the peripheral device to illuminate in such a manner as to identify that the peripheral device is associated with the selected peripheral icon.

20. The method of claim 19, wherein the indicator light illuminates in a distinctive, blinking pattern.

21. The method of claim 19, wherein the computer system includes a plurality of indicator lights, and wherein each indicator light is associated with one of the plurality of peripheral devices, further comprising the steps of:

displaying a plurality of peripheral icons, each representing one of the plurality of peripheral devices;

selecting one of the plurality of peripheral icons on the display device using the input device; and causing an indicator light associated with the peripheral device corresponding to the selected peripheral icon to illuminate.

22. The method of claim 19, wherein the computer system includes a plurality of indicator lights, and wherein each indicator light is associated with one of the plurality of peripheral devices, further comprising the steps of:

displaying a group icon representing a group of the plurality of peripheral devices;

selecting the group icon on the display device using the input device; and causing each indicator light associated with each of the plurality of peripheral devices in the group to illuminate.

23. The method of claim 19, wherein the plurality of peripheral devices comprises a plurality of disk drivers, wherein the computer system includes a plurality of indicator lights, and wherein each indicator light is associated with one of the plurality of disk drives, further comprising the steps of:

displaying a logical drive icon representing data stored on at least two of the plurality of disk drives;

selecting the logical drive icon on the display device using the input device; and causing each indicator light associated with each of the at least two of the plurality of disk drives to illuminate.

* * * * *